United States Patent Office 2,918,516
Patented Dec. 22, 1959

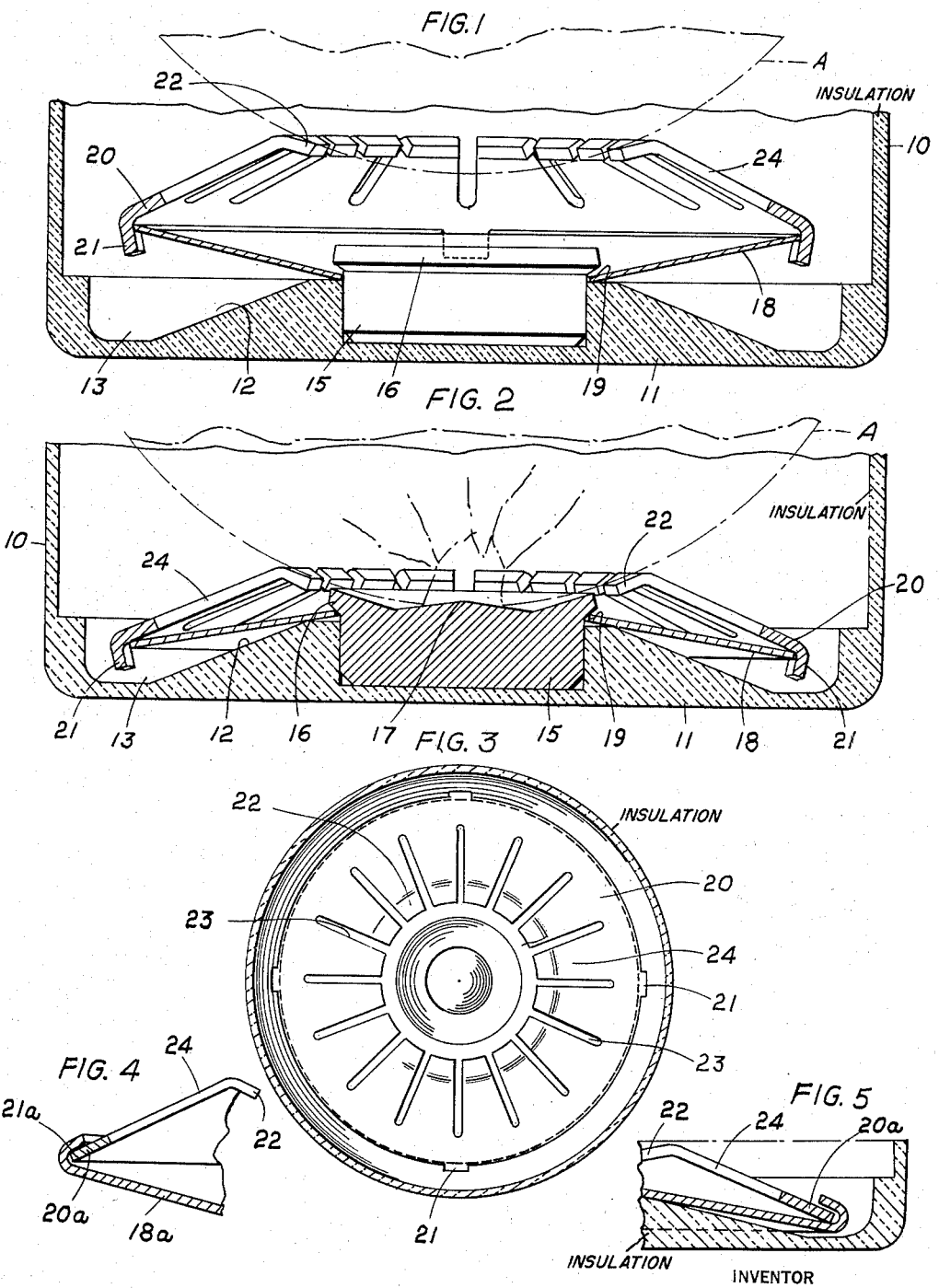

2,918,516

DEFERRED ACTION BATTERY CONTAINING FRANGIBLE AMPOULE AND BREAKER CONSTRUCTION

Franklin L. Everett, Silver Spring, Md., assignor to the United States of America as represented by the Secretary of the Navy Application August 25, 1945, Serial No. 612,628

2 Claims. (Cl. 136—90)

The present invention relates generally to delayed action batteries, commonly known as deferred action batteries, which are activated by breaking a frangible ampule to release the electrolyte. More specifically, the invention relates to a novel breaker mechanism for the frangible ampule or liquid electrolyte container, which container is shattered by impact of the breaker mechanism to free the electrolyte preliminary to distribution of the freed electrolyte to the surrounding electrode assembly.

The shattering impact applied to the ampule is caused by force of set-back, such as that created in a projectile as the gun is fired.

An object of the present invention is to provide a batery ampule breaker mechanism of compact form having a small number of parts which may be readily manufactured and assembled and will occupy a comparatively small space in the interior of the battery.

Another object is to provide a breaker mechanism which serves as an effective means for supporting the ampule in safety position against accidental displacement and acts as a collapsible support which is reliable in its action under force of setback, to shatter the ampule quickly for activating the battery.

In a breaker mechanism made in accordance with the invention, the resiliency of an open-center, reversible, concavo-convex metal disk, commercially known as a Belleville washer, is employed in a collapsible support or safety means for cushioning and absorbing accidental shocks imparted to the ampule in the normal handling of the battery. In the quick action of shattering the ampule by force of setback, the collapse of the support or seat for the ampule is expedited by the final swing or deflection of the resilient washer after it passes its point of zero deflection or dead center.

These and other objects of the invention will be understood by reference to the accompanying drawings, in which Fig. 1 is an enlarged transverse sectional view of one form of the new breaker mechanism, showing the lower end of the ampule supported upon its collapsible seat;

Figure 2 is a similar view showing the ampule in position as it is shattered;

Figure 3 is a plan view of the breaker mechanism, and

Figures 4 and 5 are fragmentary detail sectional views showing a modified arrangement of the lugs or hooks coupling the cushion frame and the Belleville washer.

Referring to the drawing, the lower rounded end of the ampule A which constitutes the liquid electrolyte container is indicated as supported within the lower end of a cylindrical holder or case 10 which is usually fashioned from molded plastic material, such as Tenite. This insulating holder, which may approximate 71/100 of an inch in diameter in actual practice, is contained within the central well (not shown) of a deferred action battery. It will be understood that when the ampule A is shattered to free the liquid electrolyte, the latter is distributed to the surrounding electrode of the battery, as by centrifugal force due to rotation of the battery about its central axis in the associated equipment.

The cylindrical holder 10 is fashioned with a bottom 11 having a central internal raised surface 12 forming an annular recess 13. The raised portion 12 has a central recess which receives a breaker point or anvil 15 cemented in the recess. The breaker 15 is preferably a solid cylindrical case-hardened steel anvil having an upper enlarged annular flange or head 16 with a dished upper face and a central conical striking point 17.

An important feature of the collapsible support for the ampule is a Belleville washer 18 having a central opening or neck 19 at its apex. This well-known washer of resilient sheet metal is initially and normally deflected, by snap action of its open central portion 19, past its dead center position, so that the washer is normally in a concavo-convex form with its concave surface facing the ampule A.

In assembling the parts, the anvil 15 is slipped through the open center 19 of the washer, and after the anvil is cemented in its recess in the bottom 11 the washer is retained in place by the flange 16 of the anvil. The cushion or seat portion of the collapsible support includes a resilient spider frame 20, preferably of suitable spring material, in the shape of an annular disk slightly larger in diameter than the washer. The neck 19 of the washer 18 is pivotally mounted under the anvil head 16, and the rim of the washer is pivotally supported in downwardly curved fingers 21 on the frame 20 to form a collapsible unit. Thus, the washer 18 is loosely coupled with the anvil 15, and the cushion or seat 20 is connected with the washer to provide a compactly arranged unit within the bottom of the holder.

In Figures 4 and 5, the fingers 21a are shown integral with the washer 18a, and the fingers are curved upwardly and inwardly around the outer edge of the spider frame 20a to provide a pivotal coupling between the washer and frame. This arrangement of the fingers above the washer in Figures 4 and 5, in lieu of below the washer in Figures 1 and 2, provides freedom from obstructions at the lower face of the washer and permits a longer snap-action of the washer in recess 13.

For directly supporting the ampule, the frame 20 (or 20a) is fashioned with a central annular downturned flange 22 conforming to the contour of the ampule A, and to cushion this seat the frame is fashioned with an annular series of radial slots 23 extending outwardly from the open center of the frame and terminating adjacent its rim to form prongs or fingers 24.

In Figure 1, where the unit is shown in armed, safety position before the setback force is applied, the deflected resilient washer 18 is held under required tension by the retaining lugs 21 to stabilize the collapsible cushioned seat 20 as a support for the ampule.

When the assembly is subjected to a force of setback acting downwardly, as shown, the cushioned support 20 is collapsed, and the ampule A, also under force of setback, plunge against the point 17 and flange head 16 so that it is shattered to free the contained liquid electrolyte. In this quick-action collapse of the supporting cushion from the position of Figure 1 to that of Figure 2, the frame 20 is deflected, flattened, or fore-shortened a small amount, and its rim is consequently spread outwardly. Thus, the frame 20 as a whole is moved bodily in advance of the ampule, thereby exposing the point 17 in a path of the ampule for shattering the latter.

It will be noted that under force of setback the neck portion 19 of the dished washer 18 remains stationary, while the rim portion of the washer snaps across the dead center position of the washer. While approaching the dead center position, the washer yieldingly resists the force of setback. After snapping past the dead center position, the continued snap action of the washer 18 to its final position shown in Figure 2 adds a pull to the spider frame 20, thus aiding the force of setback in collapsing the support and breaking the ampule to activate the battery.

I claim:

1. In a deferred action battery adapted to be activated under a force of setback and having a frangible ampule for containing an electrolyte, a collapsible support for the ampule comprising a head against which the ampule is movable by a force of setback to break the ampule, a concavo-convex snap action disk centrally mounted on the head and having its concave surface facing the ampule, and an annular disk mounted on the rim of said first disk and having radial slots extending outwardly from its central portion to form resilient prongs for supporting the ampule in spaced relation to the head.

2. In a deferred action battery adapted to be activated under a force of setback and having a frangible ampoule for containing an electrolyte, a breaker comprising a base having an elevated central portion and an annular recess, an anvil mounted in said elevated central portion, a collapsible support for the ampoule including a concave-convex snap action annular spring disk centrally mounted on said base, the central opening of said spring disk loosely engaging the anvil and having its concave side initially facing the ampoule and an annular disk mounted on the rim of said spring disk, the inner portion of the disk adjacent the central opening being shaped to provide a seat for the ampoule and having radial slots extending outwardly from the central opening forming resilient prongs for supporting the ampoule in spaced relation to the head.

References Cited in the file of this patent

UNITED STATES PATENTS

| | | |
|---|---|---|
| 287,924 | Gruson et al. | Nov. 6, 1883 |
| 823,681 | Gulick | June 19, 1906 |

FOREIGN PATENTS

| | | |
|---|---|---|
| 526,800 | Great Britain | Sept. 25, 1940 |